United States Patent
Ho (10) Patent No.: US 7,991,935 B2
(45) Date of Patent: Aug. 2, 2011

(54) REMOTE CONTROL SYSTEM FOR A PORTABLE DEVICE

(75) Inventor: Chi Kin Sammy Ho, Central (HK)

(73) Assignee: Acme Research Limited, Central (HK)

( * ) Notice: Subject to any disclaimer, the term of this patent is extended or adjusted under 35 U.S.C. 154(b) by 1060 days.

(21) Appl. No.: 11/774,125

(22) Filed: Jul. 6, 2007

(65) Prior Publication Data

US 2008/0049147 A1 Feb. 28, 2008

(30) Foreign Application Priority Data

Aug. 23, 2006 (CN) .................. 2006 2 0131558 U (51) Int. Cl.
*G06F 13/00* (2006.01)
*H04L 12/58* (2006.01)
*G06K 7/10* (2006.01)
*G06F 1/16* (2006.01)
*H04N 5/225* (2006.01)

(52) U.S. Cl. .......... 710/303; 455/412.1; 235/472.1; 361/679.41; 348/373

(58) Field of Classification Search ............ 340/825.72; 710/303
See application file for complete search history.

(56) References Cited

U.S. PATENT DOCUMENTS

| 6,282,451 | B1 | 8/2001 | White |
| 6,385,772 | B1 | 5/2002 | Courtney |
| 7,353,014 | B2 * | 4/2008 | Chetty ................. 455/412.1 |
| 7,377,440 | B2 * | 5/2008 | Casey ................. 235/472.01 |
| 7,414,668 | B2 * | 8/2008 | Takahashi ................. 348/373 |
| 7,719,830 | B2 * | 5/2010 | Howarth et al. ........ 361/679.41 |
| 2005/0174489 | A1 | 8/2005 | Yokoyama et al. |
| 2005/0188418 | A1 | 8/2005 | Uchida et al. |
| 2006/0026326 | A1 * | 2/2006 | Hunt et al. ................. 710/303 |

FOREIGN PATENT DOCUMENTS

| CN | 1367990 A | 9/2002 |
| CN | 1735325 A | 2/2006 |
| JP | 2001-94819 A | 4/2001 |

* cited by examiner

*Primary Examiner* — Jennifer Mehmood
*Assistant Examiner* — John F Mortell
(74) *Attorney, Agent, or Firm* — Rabin & Berdo, P.C.

(57) ABSTRACT

A remote control system for portable devices comprises a separate programmable remote controller, a base station communicatively interconnected with a portable device, and a detachable video capture unit communicatively interconnected with the base station. In operation, a user can instantly review, browse and manage an originally optimized user interface of the portable device with the video capture unit, thereby dispensing with the need of learning and accommodating a new user interface.

9 Claims, 9 Drawing Sheets

REMOTE CONTROL SYSTEM FOR A PORTABLE DEVICE

FIELD OF THE INVENTION

The present invention relates to a remote control system for use in a portable device, more particularly, to a control system for electronically controlling a remote portable device.

BACKGROUND OF THE INVENTION

It is well-known that portable electronic devices find a wide range of applications such as voice data communication, multimedia video/audio, electronic games and the like. In the case of the voice data communication, mobile wireless communication apparatuses for example cell phones are becoming an essential communication tool in daily life, while pocket-size computers, personal digital assistants or the like are becoming more and more popular. In the case of the multimedia video/audio, portable video and/or audio apparatuses are almost ubiquitous, among which iPods of Apple Computer, Inc. can be found everywhere. A series of Nintendo's Gameboys and Sony's PSPs are among popular electronic games. These portable electronic devices allow a user to instantly manage a requested operation including performing voice data communication, watching multimedia video/audio, and playing electronic games/contests.

These portable devices generally do not provide a function of wireless remote control. They are also limited by their sizes and hardware specifications, which results in less performance and quality at their entirety or at their output parts compared to non-portable household or commercial devices of large sizes. For example, they have a display of small size, a speaker of small power, relatively poor tone quality and short run time etc. An indoor user often connects these devices to a multimedia processing means of relatively large size and high quality in order to upgrade video and/or audio output quality of the devices. This definitely requires for tedious wiring connection operations such as connection of audio, video or power source wires. Also, the user is required to complete all of these operations on the spot and can not do any operational change remotely and conveniently, due to lack of associated wireless remote control means. This inconvenience results in great limitation to application of these portable devices and inevitably affects potential customers' purchase intention of these portable devices.

Accordingly, various functional extensions have been devised to be used in combination with the portable devices thereby to enhance and extend their performance and quality. The portable devices are currently produced with functional extension inserts, modules, interfaces and/or software development toolkits, because they are designed by the manufacturers to ensure subsequent production of associated extension peripherals/accessories and kits thereof by developers and/or third development institutes for catering to market needs and demands.

However, these functional extensions merely achieve transmission of files to and from the portable devices and control the devices for finite and regular operations to the files, including reading directories of the files, opening, displaying, playing, adding and deleting the files. The functional extensions can not access to other built-in functions and/or tools as well as to configuration and interface of operational system of the portable devices. Also an additional operation interface is needed for the functional extensions so as to interact with the user. It definitely takes time for the user to study and adapt for the additional operational interface and causes inconvenience to the user who has known well the originally optimized interface.

SUMMARY OF THE INVENTION

It is an object of the present invention to provide a remote control system for use in a portable device for wirelessly controlling the portable device without the need of abandoning the originally optimized user interface with which the user is familiar.

To attain the aforesaid object, there is provided a remote control system for a portable device comprising a separate programmable remote controller, a base station communicatively interconnected with the portable device, and a video capture unit communicatively interconnected with the base station.

The video capture unit comprises a camera and a connecting member having one end connected with the camera and the other end connected with the base station.

The base station comprises a housing; at least one operation button arranged on the housing; an input unit provided on the base station and comprising a dock-adapter; an output unit comprising one or more video outputs, audio outputs and data outputs; and a programmable processing unit respectively connected with the input unit and the output unit.

The processing unit comprises a microprocessor and a wireless signal transceiver, said microprocessor being communicatively connected with the input unit and capable of controlling and driving the portable device communicatively connected with the input unit through said wireless signal transceiver in response to a command signal from the remote controller, and wherein the microprocessor transmits the data received from the portable device and the video capture unit to the output unit and/or to the remote controller through the wireless signal transceiver.

The base station further comprises an adjustable positioning member movably provided on the housing.

The positioning member comprises a bolt fixed to the base station and a body having a curved outer surface and an interior cavity with screw threads to allow the body for rotating on the bolt.

The camera comprises a casing, a lens fitted within the casing, a movable bracket, an alignment member for driving the bracket, a photosensitive circuit board secured on the bracket, and an output interface coupled to the photosensitive circuit board.

The casing is preferably provided with at least one positioning rib and/or at least one positioning slot.

The connecting member is a profile piece comprising a first interface connected with the base station, a second interface connected with the camera, and a supportive surface for supporting the camera.

The supportive surface is arranged obliquely at an angle so that the supportive surface is at right angle to a plane where a display of the portable device is.

The connecting member is preferably provided with at least one positioning rib and/or at least one positioning slot.

The remote controller further comprises a video player and/or an audio player to enable output of the received video data and/or audio data associated with the portable device.

According to the invention, the remote control system can electronically control a remote portable device. In operation, the user may instantly review, browse and manage an originally optimized user interface of the portable device with the video capture unit. The invention is obviously advantageous over the prior art. In fact, the remote control system of the invention may be utilized to control other portable devices including portable communication devices, video and/or audio devices and electronic games systems.

To have a better understanding of the invention reference is made to the following detailed description of the invention and embodiments thereof in conjunction with the accompanying drawings.

BRIEF DESCRIPTION OF THE DRAWINGS

FIGS. 2a to 2d are exploded views of parts of the embodiment shown in FIG. 1a.

DETAILED DESCRIPTION OF THE INVENTION

Figure 1A:
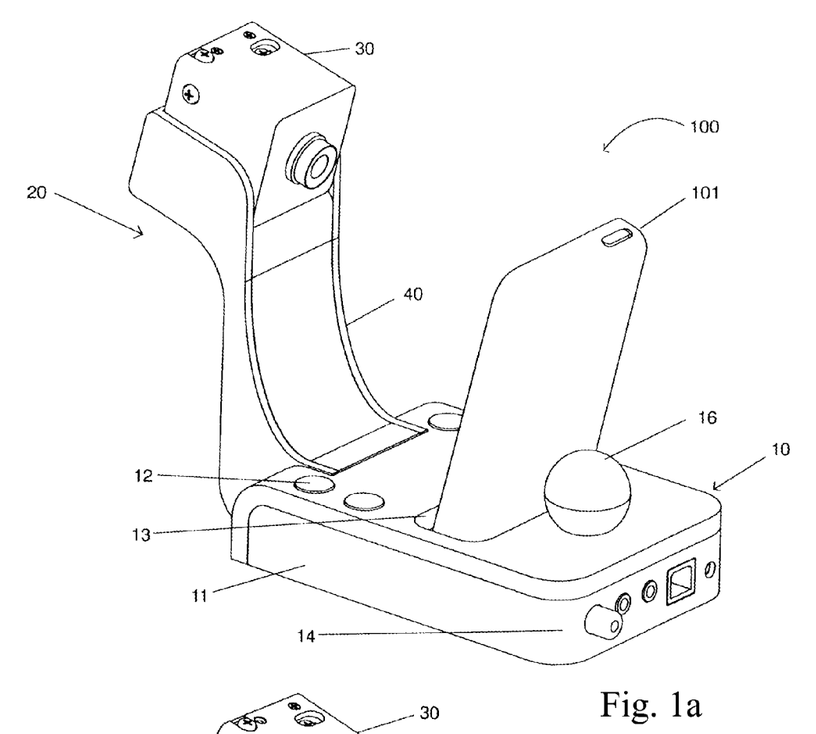
FIG. 1a is a schematic view of the remote control system for a portable device according to a first preferred embodiment of the invention.

Referring now to FIG. 1a, a remote control system 100 for a portable device constructed in consistence with a first embodiment of the invention is shown. The remote control system 100 comprises a separate programmable remote controller (not shown) including a micro processor, a wireless transceiver and an operation panel; a base station 10 communicatively interconnected with the portable device 101; and a detachable video capture unit 20 communicatively connected with the base station 10. The video capture unit 20 comprises a detachable camera 30 for providing alignment with the display of the portable device; and a connecting member 40 having one end connected with the camera 30 and the other end connected with the base station 10.

As shown in FIG. 1a, the base station 10 comprises a housing 11 on which at least one operation button 12 such as a power/play button is provided. Also, the housing may have other common buttons including forward, backward, volume up and down, selection up and down buttons, which may have different functions in different operation modes in order to reduce the number of buttons. The base station 10 further comprises an input unit 13 which comprises a detachable or adjustably replaceable dock-adapter for the purpose of connecting the input unit 13 with different types of portable devices and positioning the portable device 101; an output unit 14 which comprises one or more video outputs, audio outputs and data outputs so that video, audio and data of the portable device 101 can be transmitted to other associated devices such as wide-screen television set, advanced multimedia processor for further processing; and a processing unit (not shown) respectively connected in communicative manner with the input unit 13 and the output unit 14.

In this embodiment, the input unit 13 comprises a notch in which the detachable dock-adapter is fitted to be connected with an extension interface of the portable device 101. The portable device 101 is a common multimedia player such as iPod. It would be appreciated that, if modifications to the dock-adapter are made or a suitable adapter is used in place of the dock-adapter, the portable device 101 can also be a mobile phone having multimedia functions and/or PDA functions, or an electronic game machine having multimedia functions such as PSP, GBA, or other mobile wireless communication devices such as pocket-size computer, Personal Digital Assistant, provided that they have an interface for connection with the adapter. FIG. 1a shows that the portable device 101 is received in the notch of the base station 10 at a specified angle and docked to and secured onto the input unit 13 through an interface at the bottom of the portable device 101.

The output unit 14 optionally comprises a video output, an audio output and/or an amplified audio output, an USB interface and/or a FIREWIRE interface; and a power interface. In operation, the portable device 101 can be connected through this output unit 14 with other related devices such as large video/audio player or computer.

The processing unit comprises a microprocessor and a wireless signal transceiver (not shown). The microprocessor is communicatively connected with the input unit 13 and capable of controlling and driving the portable device 101 communicatively connected with the input unit 13 through the wireless signal transceiver in response to a command signal from the remote controller. In response to a request or a signal from the remote controller, the microprocessor transmits the data received from the portable device 101 and the video capture unit 20 to other devices connected with the output unit 14 and/or to the remote controller through the wireless signal transceiver.

The remote controller optionally further comprises a video player and/or an audio player to export the video data and/or audio data received in association with the portable device 101. For example, a user can have a basic preview and/or pre-listening in a remote manner before the portable device 101 is connected with other devices to transmit the video data and/or audio data of the portable device 101 through the output unit 14, to ensure that requested multimedia contents or data will be played. As a consequence, relatively less output quality is permissible for the video player and/or the audio player and then inexpensive parts can be used in these players.

The base station 10 preferably comprises an adjustable positioning member 16 movably provided on the housing 11 for securing the portable device 101 onto an appropriate position. The positioning member 16 comprises a bolt fixed to the base station 10 and a body having a curved outer surface and an interior cavity with screw threads to allow the body for rotating on the bolt. It would be appreciated that many other types of positioning members are possible, for example, a positioning member that is capable of moving up and down by mean of a transmission gear. As illustrated in FIG. 1a, the positioning member 16 may be shaped in a sphere, an egg, an arc or a polyhedron of approximate sphere. The positioning member 16 is configured to rotate about the bolt in a manner that it is capable of moving up and down, in this way, the positioning member 16 can fit into portable devices of different configurations and sizes for better supporting and securing the portable devices at the requested position.

The control system 100 may comprise a wireless communication unit (not shown) for wireless communication connection of the base station 10 with other electronic devices. Examples of the wireless communication unit are infra red or radio frequency transceivers and Bluetooth or WiFi transceivers. By use of the wireless communication unit, the remote controller of the remote control system 100 can control and operate the portable device 101.

Figure 1B:
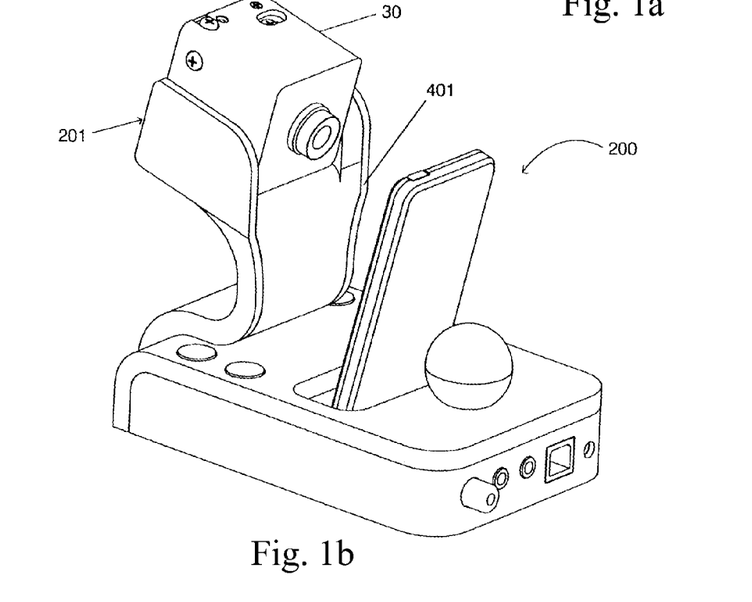
FIG. 1b is a schematic view of the remote control system for a portable device according to a second preferred embodiment of the invention.
Figures 2A, 2B:
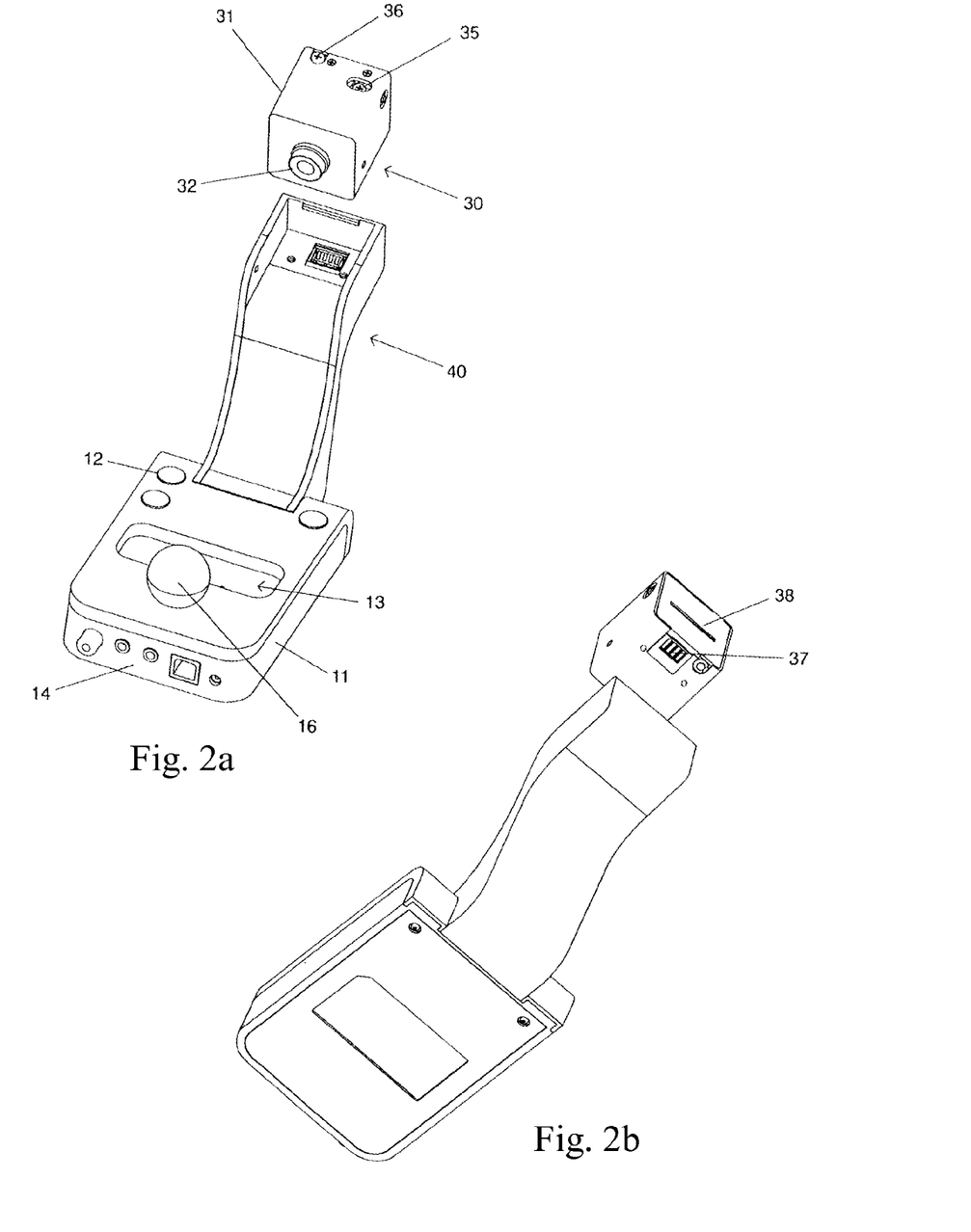
Figure 2C:
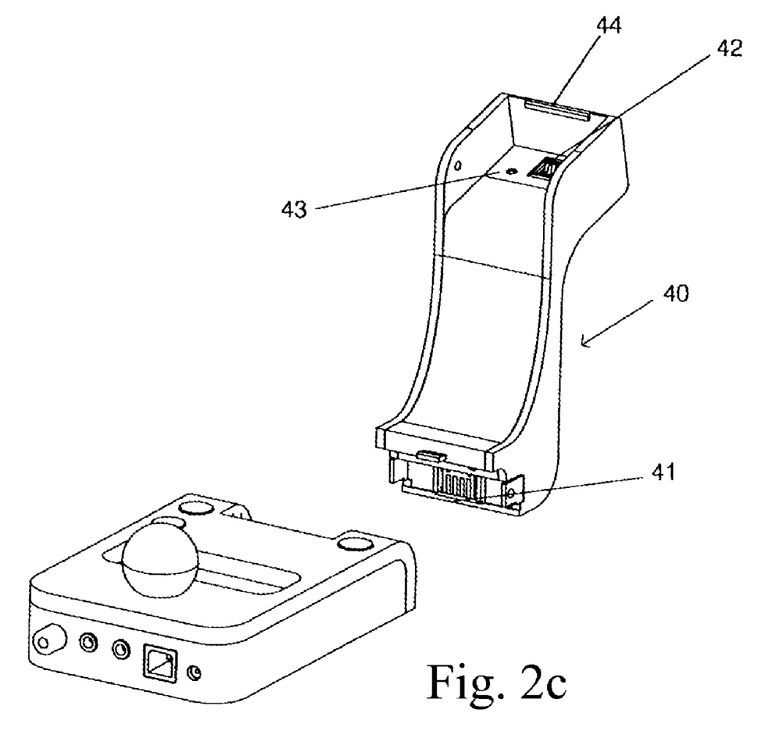
Figure 2D:
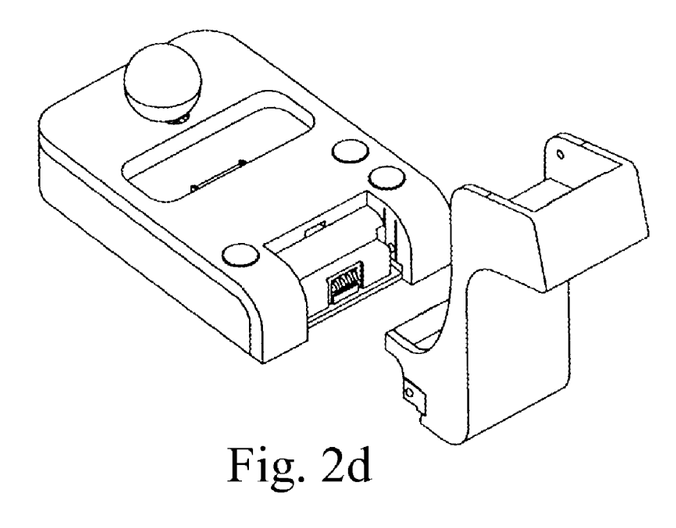

FIG. 1b illustrates a remote control system 200 for a portable device constructed in consistence with a second embodiment of the invention. The remote control system 200 is generally identical to the remote control system 100 shown in FIG. 1*a*. In the second embodiment, the portable device 101 is an iPod-Nano which has a relatively small size. The remote control system 200 comprises a video capture unit 201 communicatively connected with the base station 10. Likewise, the video capture unit 201 comprises a detachable camera 30 and a connecting member 401 having one end connected with the camera 30 and the other end connected with the base station 10. The connecting member 401 is modified to adapt for the iPod-Nano of small size, on the basis of the connecting member 40. This modification is made in order to ensure that the camera 30 is in accurate alignment with the display of the portable device 101. For this purpose, other modifications are within the ability of a person with ordinary skills in the art, for example, a lifting mechanism may be provided to guide the camera 30 in up and down movements in cooperation with the portable device 101. However, the provision of the lifting mechanism would result in complicated construction, increased number of parts, large size and weight, production time and cost for the connecting member 401. According to the invention, it is cost-effective that detachable connecting members are used to match with different portable devices.

Turning now to FIGS. 2*a* to 2*d*, there are illustrated exploded views of parts of the embodiment shown in FIG. 1*a*. The video capture unit 20 is composed of the camera 30 and the connecting member 40. The camera 30 comprises a casing 31, a lens 32 fitted within the casing, a movable bracket (not shown), an alignment member for driving the bracket, a photosensitive circuit board (not shown) secured on the bracket, and an output interface 37 coupled to the photosensitive circuit board. The casing 31 preferably has at least one positioning slot 38 and/or at least one positioning rib, though the friction force generated between the casing and the connecting member 40 and the docking force therebetween are sufficient for securing the camera to a defined position.

The connecting member 40 is a profile piece comprising a first interface 41 connected with the base station 10, a second interface 42 connected with the camera 30, and a recess support having a supportive surface 43 for supporting the camera 30. The interfaces 41, 42 include a wiring structure and a positioning mechanism well-known in the art so that enablement of communication connection and data exchange is permissible between the camera 30 and the processing unit of the base station 10. A planar surface may also be used as the support, provided that the second interface 42 is designed to generate sufficient clamping force or docking force. For example, a known locking mechanism may be added for locking the output interface 37 of the camera 30 which is connected with the second interface 42. The supportive surface 43 is obliquely arranged at an acute angle to the portable device 101, preferably, at 90 degrees to a plane where the display of the portable device 101 is. Similarly, the connecting member 40 optionally has at least one positioning rib 44 and/or at least one positioning slot for engagement with the positioning slot 38 and/or positioning rib arranged on the casing 31 of the camera 30.

Figure 3:
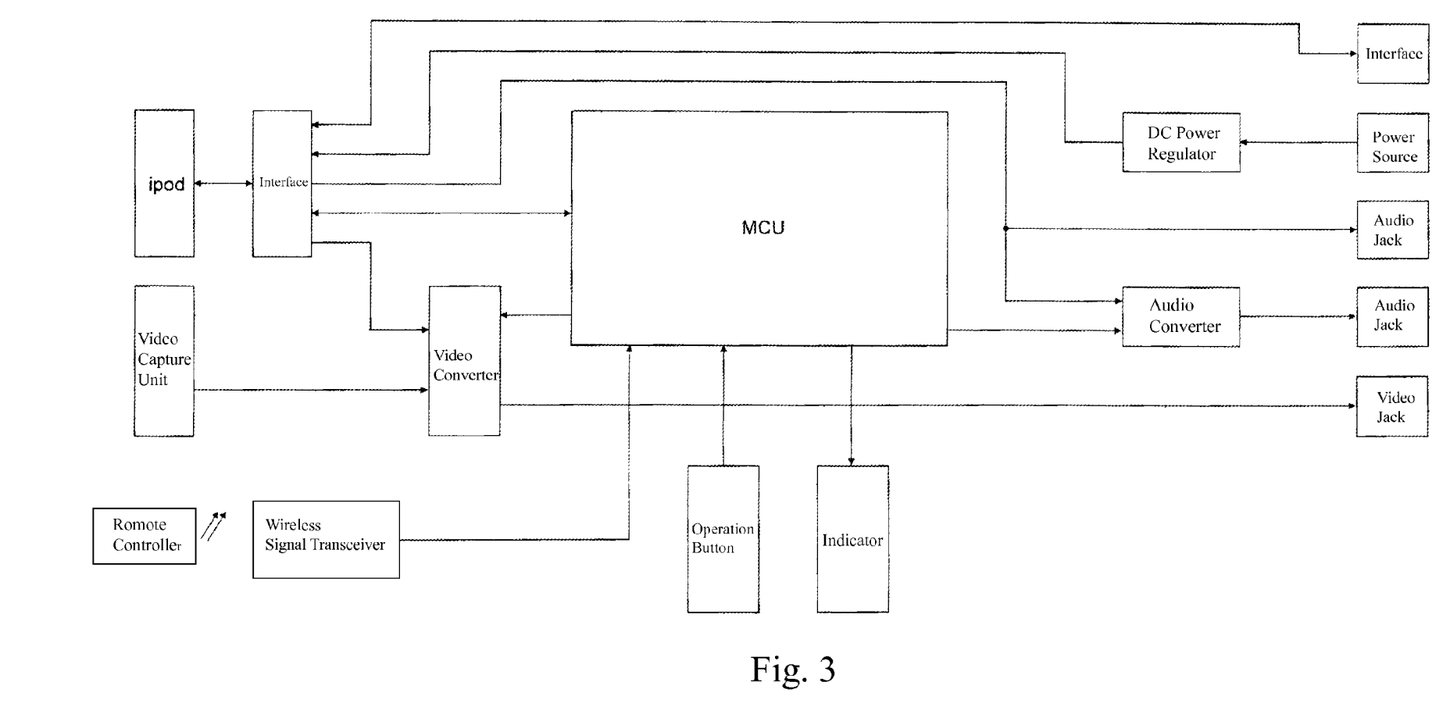
FIG. 3 is a block diagram of the remote control system for a portable device according to the invention.
Figure 4:
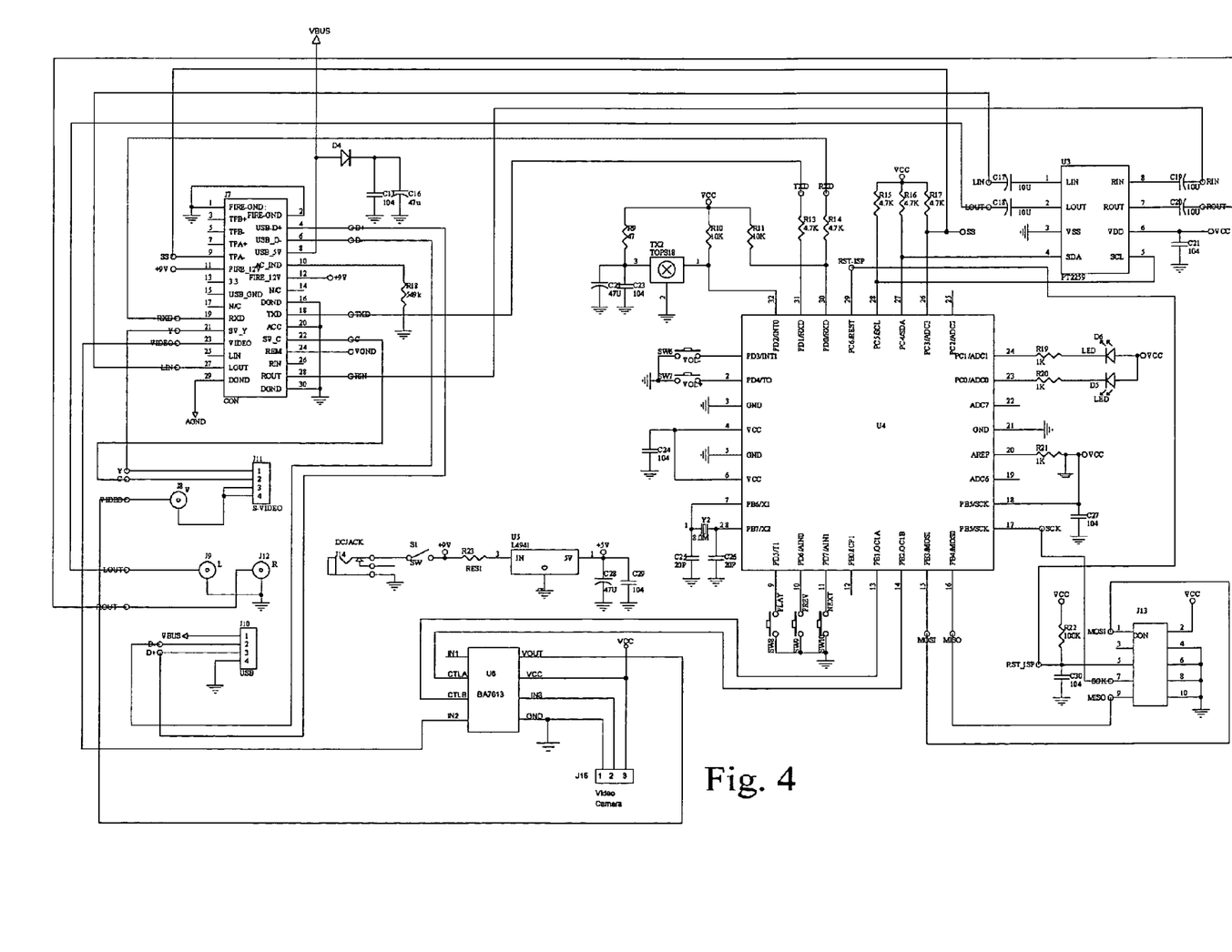
FIG. 4 is a circuit diagram of the remote control system for a portable device according to the invention.

FIGS. 3 and 4 illustrate respectively an exemplary block diagram and an exemplary circuit diagram of the remote control system for a portable device according to the invention. The processing unit U4 comprises a MCU which is communicatively connected with an input unit J7, output units J9-J12 and U3, operation buttons SW6-SW10 and a video capture unit U6 so that a requested operation can be managed.

FIGS. 5*a* to 5*d* illustrate schematic views of a camera for use in the remote control system for a portable device according to the invention. The camera 30 comprises a casing 31, a lens 32 fitted within the casing, a movable bracket 33, an alignment member for driving the bracket 33, and a photosensitive circuit board 34 secured on the bracket 33.

Figure 5A:
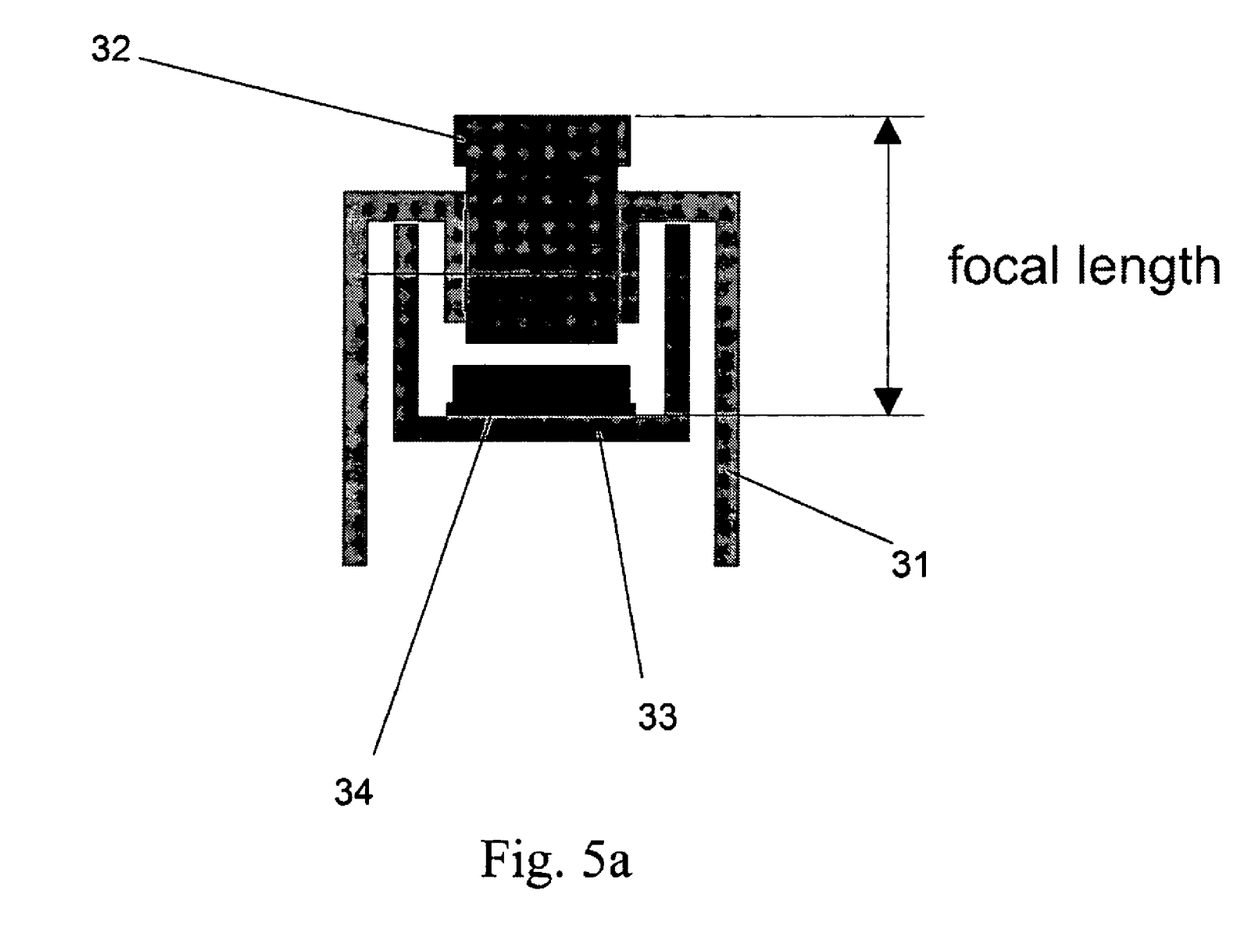
FIGS. 5a to 5d are schematic views of the camera for use in the remote control system for a portable device according to the invention.
Figure 5B:
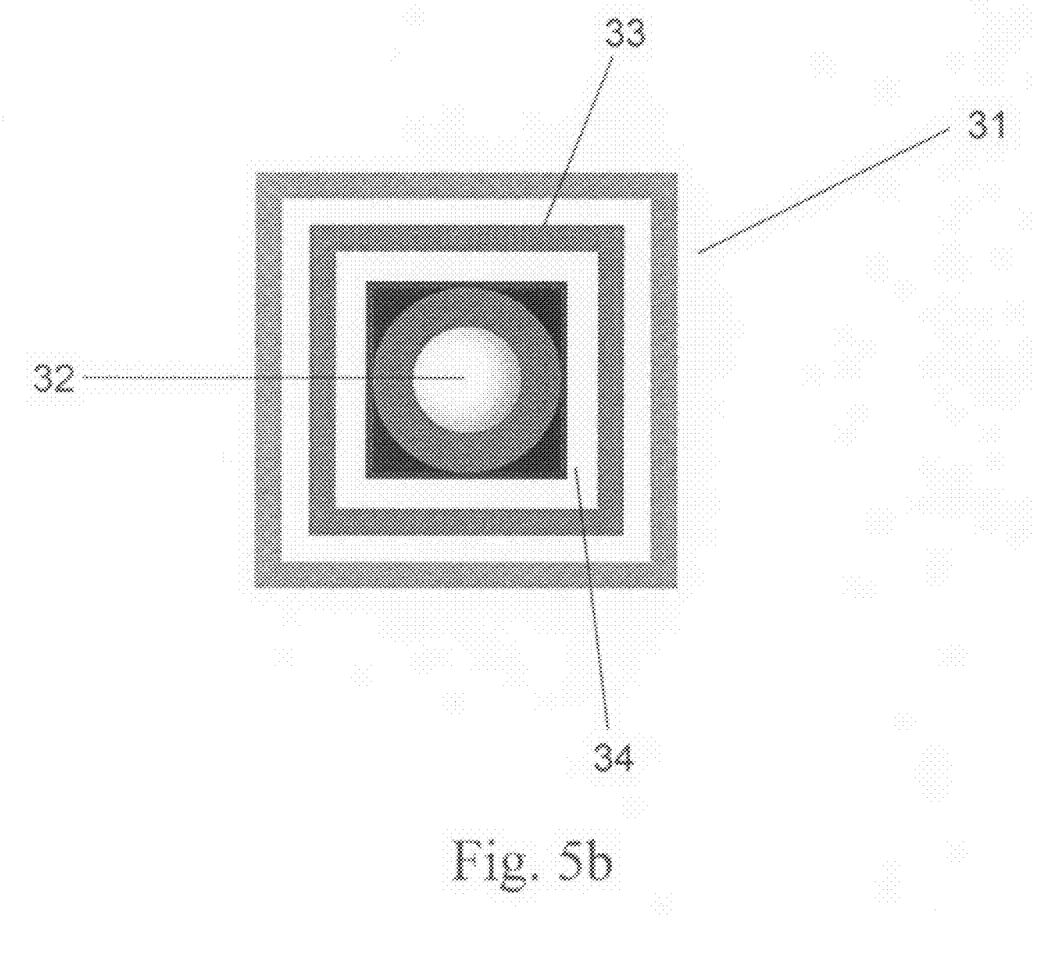
Figure 5C:
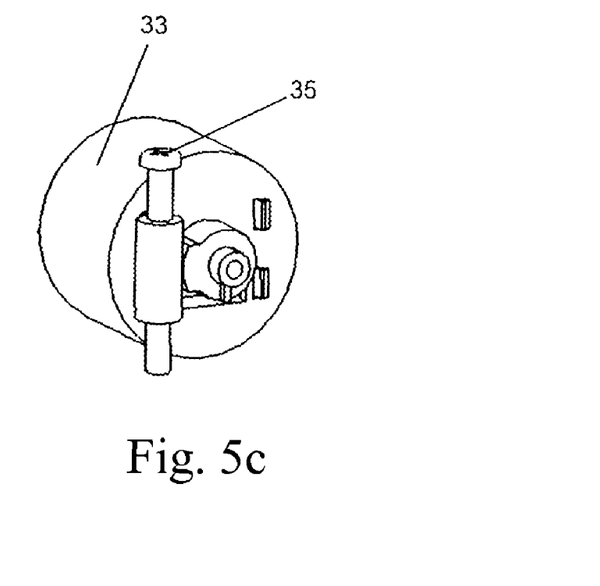
Figure 5D:
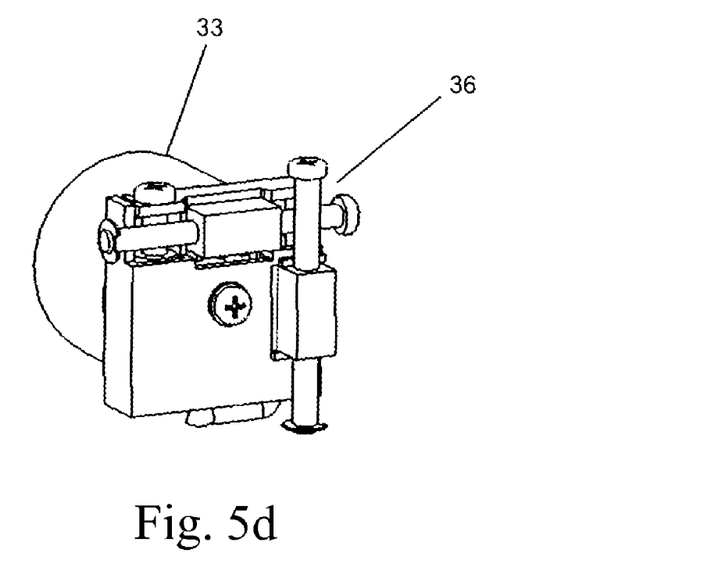
Figure 6A:
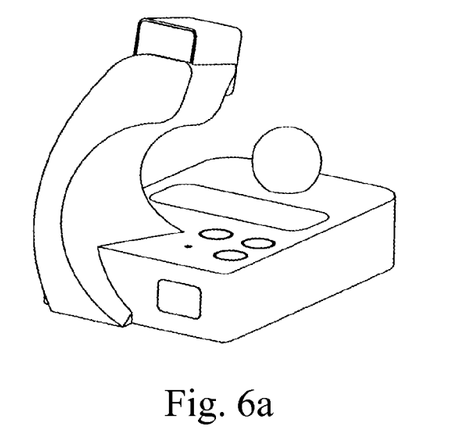
FIGS. 6a to 6d are schematic views of the remote control system for a portable device according to a third preferred embodiment of the invention.
Figure 6B:
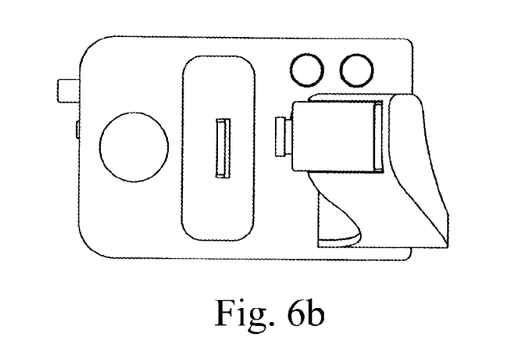
Figure 6C:
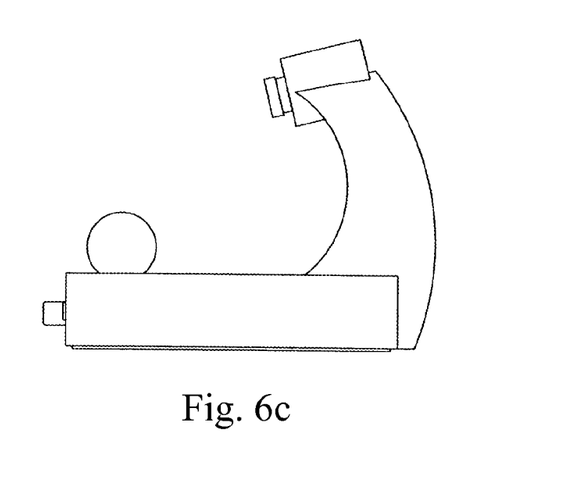
Figure 6D:
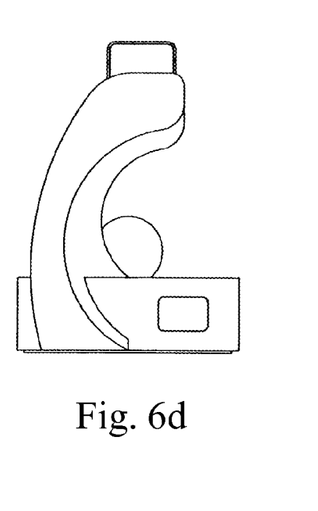

It should be understood that a commonly available camera includes a photosensitive circuit board which might have some defects due to various manufacturing factors. For example, the photosensitive element of the camera is not ideally secured on a requested position and might shift up and down or left and right slightly, or a tilting phenomena would take place since the upper and lower borders of the camera are not parallel accurately to the upper and lower borders of the photosensitive circuit board, so that the camera takes pictures with deviation. In order to ensure that the lens 32 of the camera 30 is accurately aligned with the photosensitive element to obtain quality pictures, an arrangement is used in the invention that the photosensitive circuit board 34 is supported on the movable bracket 33 which is driven by the alignment member. As shown in FIGS. 5*c* and 5*d*, the alignment member comprises a first bolt 35 for rotating the photosensitive circuit board 34 and two second bolts 36 for causing respectively the photosensitive circuit board 34 to move up and down or move left and right. This alignment member allows for achievement of ideal alignment, as shown in FIG. 5*b*. It is obvious that other arrangements or structures are possible. For example, one or more miniature motors may be used in place of the bolts for driving the photosensitive circuit board 34, which, however, would result in complicated construction, increased number of parts, large size and weight, production time and cost for the alignment member. The bolt mechanism of the invention is simple in construction and therefore more cost-effective.

FIGS. 6*a* to 6*d* illustrate schematic views of the remote control system for a portable device according to a third preferred embodiment of the invention. The system of this embodiment differs in configuration of the video capture unit (which is critical to the invention) from the systems of the previous embodiments. In fact, many different variations in the appearance of the remote control system of the invention are possible with respect to a target portable device, so as to enhance the operation amusement and/or provide consistence, harmony and esthetical feeling with the portable device as a whole. It would be appreciated that the remote control system of the invention may be produced in many configurations, forms and materials in cooperation with the target portable device.

It is understood that the remote control system of the invention may be provided with additional functions. For example, the remote control system may be configured to be used as an automatic charger for the portable device or as a buffer when the portable device is connected with a computer.

The invention thus provides a remote control system which can electronically control a portable device. In operation, the user may instantly review, browse and manage an originally optimized user interface of the portable device with the video capture unit, without the need of learning and accommodating a new user interface. This allows the user to enjoy the operation of the remote control system.

While the embodiments described herein are intended as exemplary remote control systems, it will be appreciated by those skilled in the art that the present invention is not limited to the embodiments illustrated. Numerous variations and modifications are easily obtainable by means of the skilled person's common knowledge without departing from the scope of the invention, however, such variations and modifications should fall into the scope of this invention.

What is claimed is:

1. A remote control system for electronically controlling a remote portable device comprising:
   a programmable remote controller that is separate from the portable device,
   a base station communicatively interconnected with the portable device, and
   a video capture unit communicatively interconnected with the base station;
   wherein the video capture unit comprises:
      a camera configured to capture an image of a display of the portable device, and a connecting member having one end connected with the camera and the other end connected with the base station;
   the base station comprises:
      a housing;
      at least one operation button arranged on the housing;
      an input unit provided on the base station for connecting to the portable device;
      an output unit comprising one or more video outputs, audio outputs and data outputs so that video, audio and data of the portable device can be transmitted to other associated devices for further processing, so that an originally optimized user interface of the portable device can be instantly reviewed, browsed and managed; and
      a programmable processing unit respectively connected with the input unit and the output unit;
   the processing unit comprises a microprocessor and a wireless signal transceiver, the microprocessor of the processing unit being communicatively connected with the input unit of the base station, and configured to control and drive the portable device communicatively connected with the input unit in response to a command signal from the remote controller through the wireless signal transceiver; and in response to a wireless request or a wireless signal from the remote controller, the microprocessor transmits data received from the portable device and the video capture unit to said other associated devices connected with the output unit and/or to the remote controller through the wireless signal transceiver.

2. The system as claimed in claim 1, wherein the base station further comprises an adjustable positioning member movably provided on the housing.

3. The system as claimed in claim 2, wherein the positioning member comprises a bolt fixed to the base station and a body having a curved outer surface and an interior cavity with screw threads to allow the body for rotating on the bolt.

4. The system as claimed in claim 1, wherein the camera comprises a casing, a lens fitted within the casing, a movable bracket, at least one alignment member for driving the bracket, a photosensitive circuit board secured on the bracket, and an output interface coupled to the photosensitive circuit board.

5. The system as claimed in claim 4, wherein the casing is provided with at least one positioning rib and/or at least one positioning slot.

6. The system as claimed in claim 1, wherein the connecting member is a profile piece comprising a first interface connected with the base station, a second interface connected with the camera, and a supportive surface for supporting the camera.

7. The system as claimed in claim 6, wherein the supportive surface is arranged obliquely at an angle so that the supportive surface is at right angle to a plane where a display of the portable device is.

8. The system as claimed in claim 1, wherein the connecting member is provided with at least one positioning rib and/or at least one positioning slot.

9. The system as claimed in claim 1, wherein the remote controller further comprises a video player and/or an audio player to enable output of the received video data and/or audio data associated with the portable device.

* * * * *